United States Patent
Suzuki

(10) Patent No.: US 10,105,991 B2
(45) Date of Patent: Oct. 23, 2018

(54) STEEL CORD FOR REINFORCING RUBBER ARTICLE, AND PNEUMATIC TIRE USING SAME

(71) Applicant: BRIDGESTONE CORPORATION, Tokyo (JP)

(72) Inventor: Hideto Suzuki, Iruma (JP)

(73) Assignee: BRIDGESTONE CORPORATION, Tokyo (JP)

( * ) Notice: Subject to any disclaimer, the term of this patent is extended or adjusted under 35 U.S.C. 154(b) by 19 days.

(21) Appl. No.: 15/504,526

(22) PCT Filed: Sep. 3, 2015

(86) PCT No.: PCT/JP2015/004479
§ 371 (c)(1),
(2) Date: Feb. 16, 2017

(87) PCT Pub. No.: WO2016/051669
PCT Pub. Date: Apr. 7, 2016

(65) Prior Publication Data
US 2017/0232798 A1    Aug. 17, 2017

(30) Foreign Application Priority Data
Oct. 1, 2014    (JP) .................................. 2014-203198

(51) Int. Cl.
*B60C 9/00*    (2006.01)
*D07B 1/06*    (2006.01)

(52) U.S. Cl.
CPC .............. *B60C 9/0007* (2013.01); *B60C 9/00* (2013.01); *D07B 1/06* (2013.01); *D07B 1/0613* (2013.01); *D07B 1/0626* (2013.01)

(58) Field of Classification Search
CPC ........... B60C 9/00; B60C 9/0007; B60C 9/16; B60C 9/18; B60C 9/20; B60C 2009/0021;
(Continued)

(56) References Cited

U.S. PATENT DOCUMENTS

| 3,032,963 | A |   | 5/1962 | Fenner |
| 3,336,744 | A | * | 8/1967 | Peene .................... D07B 1/062 |
|   |   |   |   | 57/212 |

(Continued)

FOREIGN PATENT DOCUMENTS

| CN | 101517158 A | 8/2009 |
| CN | 102471998 A | 5/2012 |

(Continued)

OTHER PUBLICATIONS

International Search Report for PCT/JP2015/004479 dated Nov. 17, 2015 [PCT/ISA/210].

(Continued)

*Primary Examiner* — Ismael Izaguirre
(74) *Attorney, Agent, or Firm* — Sughrue Mion, PLLC

(57) ABSTRACT

This steel cord for reinforcing a rubber article includes one core strand having a two-layer twisted layer structure formed by intertwining a plurality of steel filaments, and a plurality of sheath strands having a twisted layer structure formed by intertwining a plurality of steel filaments. The sheath strands are intertwined around the core strand, a core of the core strand is formed by two core filaments, and the diameter of outermost layer sheath filaments forming an outermost layer sheath of each sheath strand is greater than the diameter of filaments inside the outermost layer sheath of the sheath strand.

8 Claims, 2 Drawing Sheets

(58) Field of Classification Search
CPC ...... D07B 1/06; D07B 1/0613; D07B 1/0626; D07B 1/0606; D07B 1/0633; D07B 1/673; D07B 1/0693; D02G 3/22
See application file for complete search history.

(56) References Cited

U.S. PATENT DOCUMENTS

| | | | |
|---|---|---|---|
| 4,651,513 A * | 3/1987 | Dambre | C21D 8/06 |
| | | | 152/451 |
| 4,827,708 A * | 5/1989 | Verreet | D07B 5/007 |
| | | | 57/212 |
| 6,863,103 B1 | 3/2005 | Masubuchi et al. | |
| 8,033,311 B2 * | 10/2011 | Alvarez | B60C 9/0007 |
| | | | 152/451 |
| 8,117,818 B2 | 2/2012 | Ikehara | |
| 9,249,826 B2 * | 2/2016 | Tsuda | D07B 1/0673 |
| 2012/0174557 A1 | 7/2012 | Boisseau et al. | |
| 2013/0032264 A1 * | 2/2013 | Cheng | D07B 1/0613 |
| | | | 152/451 |
| 2017/0210169 A1 | 7/2017 | Nozaki | |
| 2017/0210170 A1 | 7/2017 | Nozaki | |
| 2017/0211229 A1 | 7/2017 | Nozaki | |

FOREIGN PATENT DOCUMENTS

| | | |
|---|---|---|
| CN | 103370468 A | 10/2013 |
| EP | 1 126 073 A2 | 8/2001 |
| EP | 2 653 608 A1 | 10/2013 |
| EP | 2 851 465 A1 | 3/2015 |
| JP | 08027682 * | 1/1996 |
| JP | 11-021775 A | 1/1999 |
| JP | 2000-129584 A | 5/2000 |
| JP | 2006-022440 A | 1/2006 |
| JP | 2009-108460 A | 5/2009 |
| JP | 2013-522493 A | 6/2013 |
| JP | 2016-30863 A | 3/2016 |
| KR | 10-0785241 B1 | 12/2007 |
| WO | 01/034900 A1 | 5/2001 |
| WO | WO 2009048054 A1 * | 4/2009 |
| WO | 2013/168678 A1 | 11/2013 |
| WO | 2016/017654 A1 | 2/2016 |
| WO | 2016/017655 A1 | 2/2016 |

OTHER PUBLICATIONS

Communication dated Sep. 19, 2017 from the European Patent Office in counterpart application No. 15846966.8.
Communication dated May 24, 2018 from the State Intellectual Property Office of the P.R.C. in counterpart Application No. 201580051527.X.

* cited by examiner

STEEL CORD FOR REINFORCING RUBBER ARTICLE, AND PNEUMATIC TIRE USING SAME

CROSS REFERENCE TO RELATED APPLICATIONS

This application is a National Stage of International Application No. PCT/JP2015/004479, filed on Sep. 3, 2015, which claims priority from Japanese Patent Application No. 2014-203198, filed on Oct. 1, 2014, the contents of all of which are incorporated herein by reference in their entirety.

TECHNICAL FIELD

This disclosure relates to a steel cord for reinforcing a rubber article and to a pneumatic tire using the steel cord (also referred to below simply as a "cord" and a "tire").

BACKGROUND

In rubber articles, such as tires, steel cords formed by intertwining a plurality of steel filaments are widely used as a reinforcing member. In particular, a tire that is used in heavy-duty vehicles such as construction and mining vehicles is used under a large load on highly uneven, rough terrain and the like. Therefore, the steel cords that act as the reinforcing member in particular need to have high strength and durability. Hence, in such large-sized tires, steel cords with a so-called multi-twisted structure are adopted, yielded by further intertwining a plurality of strands that are each formed by intertwining a plurality of steel filaments.

In the case of a multi-twisted structure steel cord, the outermost layer sheath filaments of the core strand and the sheath strands come into rough contact with each other due to cord tension occurring when the tire is used, or due to a cut input when the tire rolls over a blunt or sharp projection. Because of stress concentrating at the point of contact, the filaments may undergo early shear failure.

As an approach for solving this problem, for example JP H11-21775 A (PTL 1) discloses that in a steel cord for reinforcing a rubber article, the steel cord having a multi-twisted structure in which 5 to 7 sheath strands having a twisted layer structure with two or more layers are arrayed and intertwined around one core strand having a twisted layer structure with two or more layers, the tensile strength of the outermost layer sheath filaments forming each strand is 3040 N/mm$^2$ or less, and the tensile strength of all of the inner filaments excluding the outermost layer sheath filaments is 3140 N/mm$^2$ or more. In such a steel cord, early breakage of the contact portion between the outermost layer sheath filaments of the core strand and the sheath strands is suppressed, improving the cord strength as compared to a conventional steel cord for reinforcing a rubber article.

CITATION LIST

Patent Literature

PTL 1: JP H11-21775 A

SUMMARY

Technical Problem

With demand in recent years for better tire performance, however, there has been a demand for an increase in the anti-cut resistance of a steel cord for reinforcing a rubber article. On the other hand, in order to decrease the burden on the environment, there has been increasing demand in recent years for reducing the weight of tires as well. Therefore, it is desirable to further improve tire performance while avoiding an increase in the diameter and weight of the steel cord.

Therefore, it would be helpful to provide a steel cord for reinforcing a rubber article, and a pneumatic tire using the steel cord, that can improve the anti-cut resistance when the steel cord is applied to rubber articles such as tires, while avoiding an increase in the diameter and weight of the steel cord.

Solution to Problem

A steel cord for reinforcing a rubber article according to this disclosure comprises:
one core strand having a two-layer twisted layer structure formed by intertwining a plurality of steel filaments; and
a plurality of sheath strands having a twisted layer structure formed by intertwining a plurality of steel filaments;
wherein the sheath strands are intertwined around the core strand; and
wherein a core of the core strand is formed by two core filaments, and a diameter of outermost layer sheath filaments forming an outermost layer sheath of each sheath strand is greater than a diameter of a filament inside the outermost layer sheath of the sheath strand.

According to the steel cord for reinforcing a rubber article of this disclosure, the anti-cut resistance can be improved when the steel cord is applied to rubber articles such as tires, while avoiding an increase in the diameter and weight of the steel cord.

Advantageous Effect

According to this disclosure, it is possible to provide a steel cord for reinforcing a rubber article, and a pneumatic tire using the steel cord, that can improve the anti-cut resistance when the steel cord is applied to rubber articles such as tires, while avoiding an increase in the diameter and weight of the steel cord.

DETAILED DESCRIPTION

The following describes embodiments for implementing this disclosure.

Figure 1A:
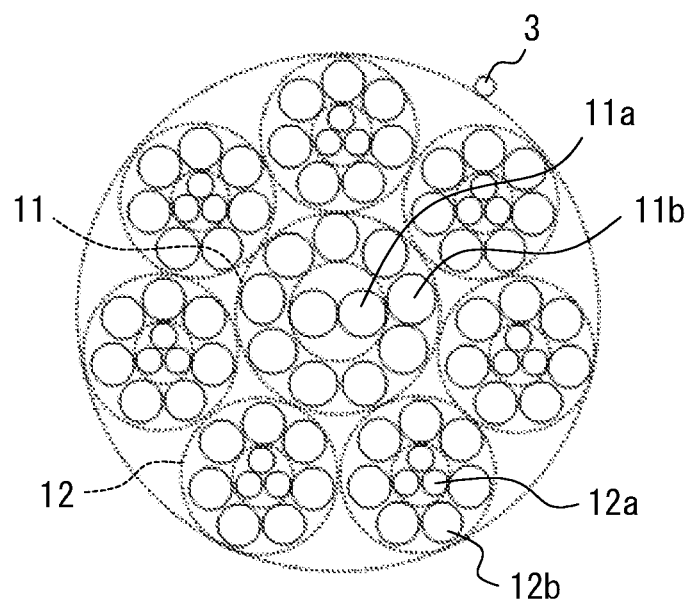
FIGS. 1A and 1B are cross-sectional diagrams, in a direction orthogonal to the longitudinal direction of the steel cord, illustrating configuration examples of the steel cord for reinforcing a rubber article according to this disclosure (Examples 1 to 3)
Figure 1B:
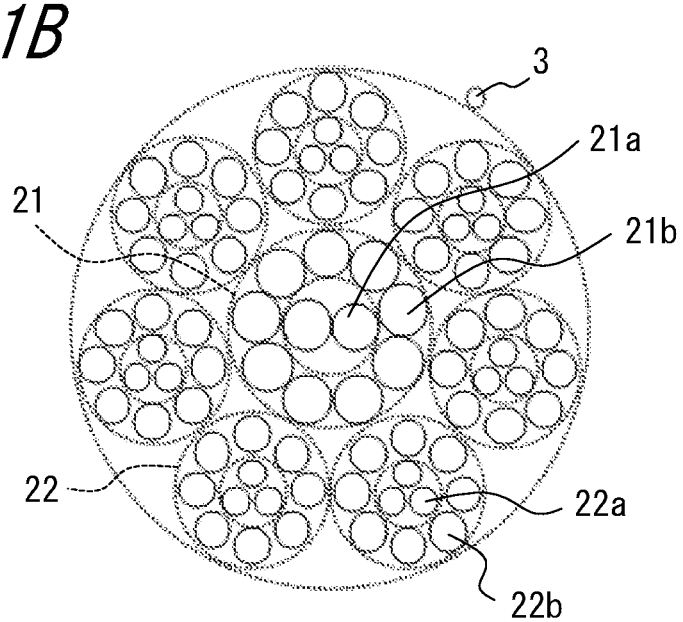

FIGS. 1A and 1B are cross-sectional diagrams, in a direction orthogonal to the longitudinal direction of the steel cord, illustrating configuration examples of the steel cord for reinforcing a rubber article according to this disclosure. The cord illustrated in FIG. 1A is formed from one core strand 11 and a plurality (seven in the illustrated example) of sheath strands 12. The core strand 11 has a two-layer twisted layer structure formed by intertwining a plurality of steel filaments 11a, 11b, and the sheath strands 12 each have a twisted layer structure (a two-layer twisted layer structure in the illustrated example) formed by intertwining a plurality of steel filaments 12a, 12b. The sheath strands 12 are intertwined around the core strand 11, thus giving the cord a multi-twisted structure. In the illustrated cord, the core strand 11 in this example has a 2+9 structure with a core comprising two intertwined core filaments 11a, nine sheath filaments 11b being intertwined around the core to form a sheath, and each sheath strand 12 in this example has a 3+7 structure with a core comprising three core filaments 12a, seven sheath filaments 12b being intertwined around the core to form a sheath. While not an essential feature, a wrapping filament 3 is wrapped spirally around the outer circumference of the sheath strands 12 in the illustrated cord. Here, the diameter of the outermost layer sheath filaments 12b forming the outermost layer sheath of each sheath strand is greater than the diameter of each filament 12a inside the outermost layer sheath of the sheath strand.

The cord illustrated in FIG. 1B is formed from one core strand 21 and a plurality, seven in the illustrated example, of sheath strands 22. The core strand 21 has a two-layer twisted layer structure formed by intertwining a plurality of steel filaments 21a, 21b, and the sheath strands 22 each have a twisted layer structure (a two-layer twisted layer structure in the illustrated example) formed by intertwining a plurality of steel filaments 22a, 22b. The sheath strands 22 are intertwined around the core strand 21, thus giving the cord a multi-twisted structure. In the illustrated cord, the core strand 21 in this example has a 2+9 structure with a core comprising two intertwined core filaments 21a, nine sheath filaments 21b being intertwined around the core to form a sheath, and each sheath strand 22 in this example has a 3+8 structure with a core comprising three core filaments 22a, eight sheath filaments 22b being intertwined around the core to form a sheath. While not an essential feature, a wrapping filament 3 is wrapped spirally around the outer circumference of the sheath strands 22 in the illustrated cord. Here, the diameter of the outermost layer sheath filaments 22b forming the outermost layer sheath of each sheath strand is greater than the diameter of each filament 22a inside the outermost layer sheath of the sheath strand.

In this disclosure, it is important that the core strands 11, 21 be formed by two core filaments 11a, 21a, and that the diameter of the outermost layer sheath filaments 12b, 22b forming the outermost layer sheath of each sheath strand 12, 22 be greater than the diameter of each filament 12a, 22a inside the outermost layer sheath of the sheath strand 12, 22. As described above, in order to improve the anti-cut resistance of the cord, it is effective to suppress early breakage of the contact portion between the outermost layer sheath filaments of the core strand and the sheath strands. In particular, in the core strand positioned at the center of the cord, it is important to suppress the concentration of stress at the outermost layer filaments. I discovered that by using two core filaments in the core strand, early breakage of the outermost layer sheath filaments of the core strand can be suppressed. While the cause is unclear, one reason is thought to be that since the clearance in the core strand can be increased by changing the number of core filaments in the core strand from the conventional three to two, the location where stress concentration tends to occur in the outermost layer filaments of the sheath strands 12, 22 can be pushed deeper into the core strand, thereby allowing the concentration of stress to be avoided. Furthermore, since the number of core strands changes from the conventional three to two, the cord can also be reduced in weight.

It is also important that the diameter of the outermost layer sheath filaments 12b, 22b forming the outermost layer sheath of each sheath strand 12, 22 be greater than the diameter of each filament 12a, 22a inside the outermost layer sheaths. As described above, by using two core filaments in the core strand, early breakage of the outermost layer sheath filaments of the core strand can be suppressed, but in order to improve the anti-cut resistance of the cord overall, it is also important to suppress breakage of the filaments of the sheath strands. Therefore, by increasing the diameter of the outermost layer filaments of the sheath strands to be greater than the diameter of the inner layer filaments, the contact area with the outermost layer sheath filaments of the core strand can be increased without increasing the diameter of the strands themselves. The load of the tightening force when an input force occurs can thus be widely born, and the concentration of stress can be eased. Since the resistance to the tightening force is increased by using two core filaments for the core strand, the stress distribution of the cord as a whole becomes optimal, and the anti-cut resistance of the cord increases.

Accordingly, for example it is also possible to set the diameter of the inner layer filaments of the sheath strand to be smaller than the diameter of the outermost layer sheath filaments so as to improve the anti-cut resistance of the cord while avoiding an increase in the diameter and the weight of the cord.

In the cord of this disclosure, the number of sheath strands 12, 22 is preferably from seven to nine. When the core strand and the sheath strands all have the same diameter, and the sheath strands are packed as tightly as possible to leave no gap therebetween, then an arrangement with six sheath strands is possible. In this configuration example, however, the diameter of the sheath strands 12, 22 is set to be less than the diameter of the core strand 11, 21, allowing an arrangement with seven to nine of the sheath strands 12, as illustrated in FIG. 1. By setting the number of sheath strands 12 to be seven to nine, the tightening force of the sheath strands on the core strand can be reduced, improving the anti-cut resistance of the cord.

Furthermore, in order to improve the filling factor of steel, the number of sheath filaments 11b, 21b forming the sheath of the core strand 11, 21 is preferably set to six or greater. Setting the number to nine, however, as in the above configuration example, is particularly preferable in order to suppress early breakage, since a wire diameter with a certain thickness can be ensured.

The number of core filaments 12a, 22a of the sheath strands 12, 22 is preferably three in order to improve the filling factor of steel, and the number of outermost layer sheath filaments 12b, 22b that form the outermost layer sheath is preferably at least six in order to improve the filling factor of steel. Setting the number of outermost layer sheath filaments 12b, 22b to be seven or eight, however, as in the above configuration example, is particularly preferable in order to suppress early breakage, since a wire diameter with a certain thickness can be ensured.

In the cords of this disclosure, the filaments forming the core strand 11, 21 preferably all have the same diameter. The anti-cut resistance can also be improved by making the core filaments 11a, 21a smaller in diameter than the sheath filaments 11b, 21b in the core strand 11, 21, but in order to ensure enough space to arrange the sheath filaments, all of the filaments forming the core strand preferably have the same diameter.

Furthermore, the cord diameter of the cord of this disclosure is preferably 4 mm or greater. By forming the cord with a thick diameter of 4 mm or greater, in particular the strength and the anti-cut resistance that are required for a large-sized tire used in heavy-duty vehicles such as construction vehicles can both be guaranteed. Also, the cord diameter of the cord of this disclosure is preferably less than 5 mm. By setting the cord diameter to be less than 5 mm, an increase in weight of the tire can be effectively suppressed. In particular, the cord diameter is preferably set to 4.5 mm.

In the cords of this disclosure, the wire diameter and tensile strength of the filaments that are used, along with the twisting direction of the filaments and strands, the twist pitch, and the like are not particularly restricted and may be selected appropriately as desired in accordance with a normal method. For example, so-called high tensile strength steel with a carbon content of 0.80% by mass or greater may be used for the filaments. The cord of this disclosure may or may not include a wrapping filament.

The cord of this disclosure has excellent anti-cut resistance and is therefore suitable for use as a reinforcing member in a large-sized tire used in heavy-duty vehicles such as construction and mining vehicles, in particular in an extra large off-road radial tire with a tire size of approximately 57 inches. Such a large-sized tire is normally provided with a carcass having one or more plies of steel cords extending radially between a pair of bead cores, an intersecting belt layer with at least four layers disposed outward in the tire radial direction from the crown of the carcass, and a tread disposed outward in the tire radial direction from the intersecting belt layer. In such a tire, the cords of this disclosure are, for example, used as reinforcing cords for the intersecting belt layer.

EXAMPLES

The following provides a detailed explanation with Examples, but this disclosure is in no way limited to the following Examples.

As shown in the tables below, a plurality of steel cords for a rubber article were produced with a multi-twisted structure while changing the number and the wire diameter of the filaments in the core strand and the sheath strands. The tables below also list the results of the following evaluations on the cords that were obtained. In the following tables, the "cord strength" was measured with the JIS G3525 method for testing breaking force with regard to tensile tests.

(Anti-Cut Resistance)

For each cord that was obtained, the anti-cut resistance was evaluated using a Charpy impact tester. The anti-cut resistance was evaluated based on the force necessary for the cord to break by dropping a blade-shaped weight thereon. A larger numerical value indicates superior anti-cut resistance and is therefore better.

TABLE 1

| | | unit | Example 1 FIG. 1A | Example 2 FIG. 1B | Example 3 FIG. 1B |
|---|---|---|---|---|---|
| | cord structure | | | | |
| core strand | structure | | 2 + 9 | 2 + 9 | 2 + 9 |
| | core filament diameter | mm | 0.455 | 0.455 | 0.480 |
| | sheath filament diameter | mm | 0.455 | 0.455 | 0.480 |
| | core strand diameter | mm | 1.820 | 1.820 | 1.920 |
| | strength | N | 4690 | 4690 | 5012 |
| sheath strand | structure | | 3 + 7 | 3 + 8 | 3 + 8 |
| | number of sheath strands | number | 7 | 7 | 7 |
| | core filament diameter | mm | 0.255 | 0.280 | 0.275 |
| | sheath filament diameter | mm | 0.415 | 0.370 | 0.365 |
| | sheath strand diameter | mm | 1.379 | 1.343 | 1.323 |
| | strength | N | 3195 | 3223 | 3160 |
| | cord diameter | mm | 4.58 | 4.51 | 4.57 |
| | cord strength | N | 27100 | 27300 | 27100 |
| | anti-cut resistance | kN | 10.26 | 10.22 | 10.20 |
| | cord weight | g/m | 77 | 74 | 74 |

TABLE 2

Figure 2A:
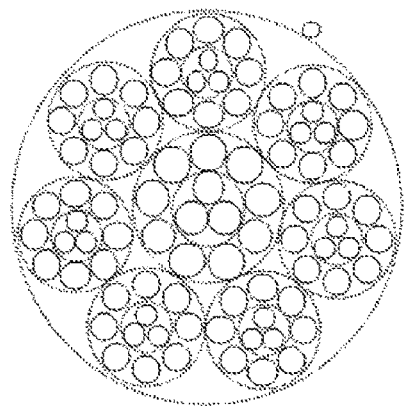
FIGS. 2A-2E are cross-sectional diagrams, in a direction orthogonal to the longitudinal direction of the steel cord, illustrating a steel cord for reinforcing a rubber article according to Comparative Examples (Comparative Examples 1 to 5).
Figure 2B:
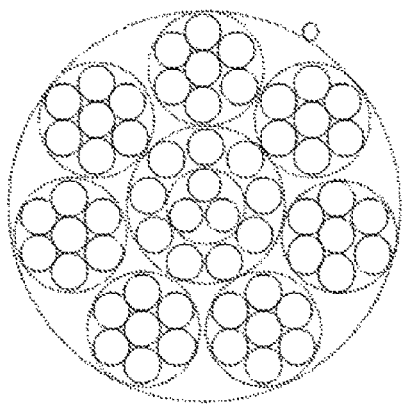
Figure 2C:
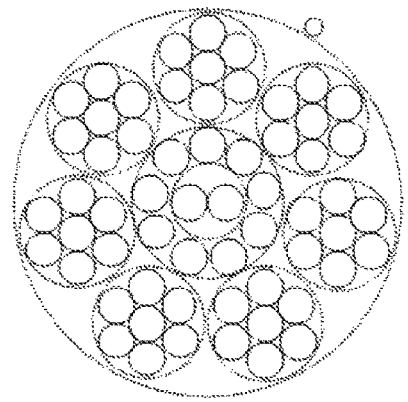
Figure 2D:
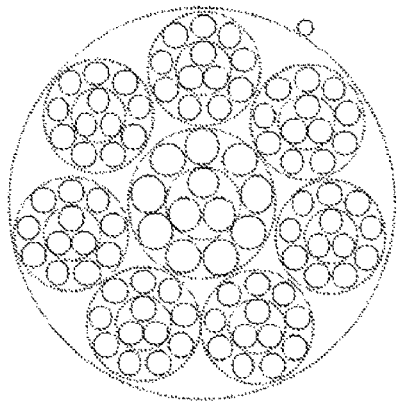
Figure 2E:
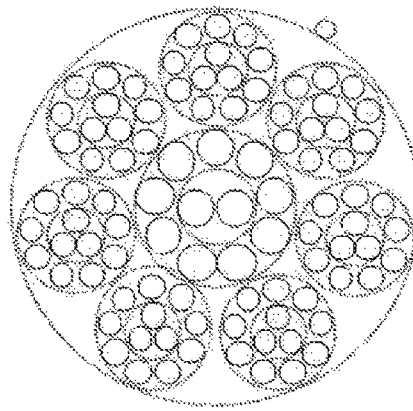

| | | unit | Comparative Example 1 FIG. 2A | Comparative Example 2 FIG. 2B | Comparative Example 3 FIG. 2C | Comparative Example 4 FIG. 2D | Comparative Example 5 FIG. 2E |
|---|---|---|---|---|---|---|---|
| | cord structure | | | | | | |
| core strand | structure | | 3 + 9 | 3 + 9 | 2 + 9 | 3 + 9 | 2 + 9 |
| | core filament diameter | mm | 0.415 | 0.415 | 0.455 | 0.415 | 0.455 |
| | sheath filament diameter | mm | 0.455 | 0.455 | 0.455 | 0.455 | 0.455 |
| | core strand diameter | mm | 1.804 | 1.804 | 1.820 | 1.804 | 1.820 |
| | strength | N | 4974 | 4974 | 4690 | 4974 | 4690 |
| sheath strand | structure | | 3 + 8 | 1 + 6 | 1 + 6 | 3 + 9 | 3 + 9 |
| | number of sheath strands | number | 7 | 7 | 7 | 7 | 7 |
| | core filament diameter | mm | 0.280 | 0.455 | 0.455 | 0.325 | 0.325 |
| | sheath filament diameter | mm | 0.370 | 0.455 | 0.455 | 0.325 | 0.325 |
| | sheath strand diameter | mm | 1.343 | 1.365 | 1.365 | 1.350 | 1.350 |
| | strength | N | 3223 | 2984 | 2984 | 3212 | 3212 |
| | cord diameter | mm | 4.49 | 4.53 | 4.55 | 4.51 | 4.52 |
| | cord strength | N | 27500 | 25900 | 25600 | 27500 | 27200 |
| | anti-cut resistance | kN | 9.83 | 9.62 | 9.41 | 9.02 | 8.86 |
| | cord weight | g/m | 75 | 79 | 78 | 72 | 71 |

Comparative Example 4 in Table 2 is a steel cord with a 3+9 structure for both the core strand and the sheath strands, i.e. three core filaments and nine sheath filaments, and has a high steel filling density, but the value of the anti-cut resistance is 9.02 kN, which is a relatively low value. In Comparative Example 5, the number of core filaments in the core strand of this structure was changed to two, but as described above, the balance between the anti-cut resistance of the core strand and the sheath strands was lost, and the anti-cut resistance of the cord overall decreased. As for the other Comparative Examples, none of Comparative Examples 1, 2, or 3 had the structure of this disclosure, and therefore the improvement in the anti-cut resistance was insufficient.

By contrast, the anti-cut resistance was improved while avoiding an increase in the diameter and weight of the steel cord in the cord of each Example in Table 1 satisfying the following conditions: using two core filaments to form the core of the core strand, and setting the sheath filament diameter of the sheath strands to be greater than the core filament diameter.

REFERENCE SIGNS LIST 11, 21 Core strand
12, 22 Sheath strand
11a, 12a, 21a, 22a Core filament
11b, 21b Sheath filament
12b, 22b Sheath filament (outermost layer sheath filament)
3 Wrapping filament

The invention claimed is:

1. A steel cord for reinforcing a rubber article, the steel cord comprising:

one core strand having a two-layer twisted layer structure formed by intertwining a plurality of steel filaments; and a plurality of sheath strands having a twisted layer structure formed by intertwining a plurality of steel filaments;

wherein the sheath strands are intertwined around the core strand; and wherein a core of the core strand is formed by two core filaments, and a diameter of outermost layer sheath filaments forming an outermost layer sheath of each sheath strand is greater than a diameter of a filament inside the outermost layer sheath of the sheath strand.

2. The steel cord for reinforcing a rubber article of claim 1, wherein the plurality of sheath strands comprises 7 to 9 sheath strands.

3. The steel cord for reinforcing a rubber article of claim 1, wherein the core strand has a 2+9 structure with the core of the core strand comprising two core filaments, nine sheath filaments being intertwined around the core of the core strand to form a sheath.

4. The steel cord for reinforcing a rubber article of claim 1, wherein each sheath strand has a 3+7 structure or a 3+8 structure with a core of the sheath strand comprising three core filaments, seven or eight sheath filaments being intertwined around the core of the sheath strand to form a sheath.

5. The steel cord for reinforcing a rubber article of claim 1, wherein each filament forming the core strand has an identical diameter.

6. The steel cord for reinforcing a rubber article of claim 1, wherein a diameter of the steel cord is 4 mm or greater.

7. The steel cord for reinforcing a rubber article of claim 1, wherein a diameter of the steel cord is less than 5 mm.

8. A pneumatic tire comprising the steel cord for reinforcing a rubber article of claim 1.

* * * * *